United States Patent

[11] 3,569,831

| [72] | Inventor | Richard K. Davis |
| | | Roanoke, Va. |
| [21] | Appl. No. | 755,929 |
| [22] | Filed | Aug. 28, 1968 |
| [45] | Patented | Mar. 9, 1971 |
| [73] | Assignee | General Electric Company |

[54] OVER-FREQUENCY ALARM
1 Claim, 1 Drawing Fig.

[52] U.S. Cl. ................................................ 324/78
[51] Int. Cl. .................................................. G01r 23/02
[50] Field of Search .......................................... 324/78 (S), 78 (Q), 78 (Z), 82, 87, 70 (c—g); 328/141

[56] References Cited
UNITED STATES PATENTS

| 2,401,163 | 5/1946 | Keller | 324/82 |
| 2,457,278 | 12/1948 | Schoenbaum | 324/82 |
| 2,522,998 | 9/1950 | Corson et al. | 324/82X |
| 3,209,212 | 9/1965 | Billings | 324/78 (S)UX |

*Primary Examiner*—Alfred E. Smith
*Attorneys*—John B. Sponsler, Gerald R. Woods, James C. Davis, Jr., Frank L. Neuhauser, Oscar B. Waddell, Melvin M. Goldenberg and Arnold E. Renner ABSTRACT: An electrical circuit adapted to compare an externally sensed frequency with a reference frequency for giving an indication when the former exceeds the latter via voltage and current phase relationship utilizing a phase shifting inductance, a resonant circuit and a transformer having a core of square loop material, a dual primary winding and an alarm connected to its secondary winding.

PATENTED MAR 9 1971
3,569,831
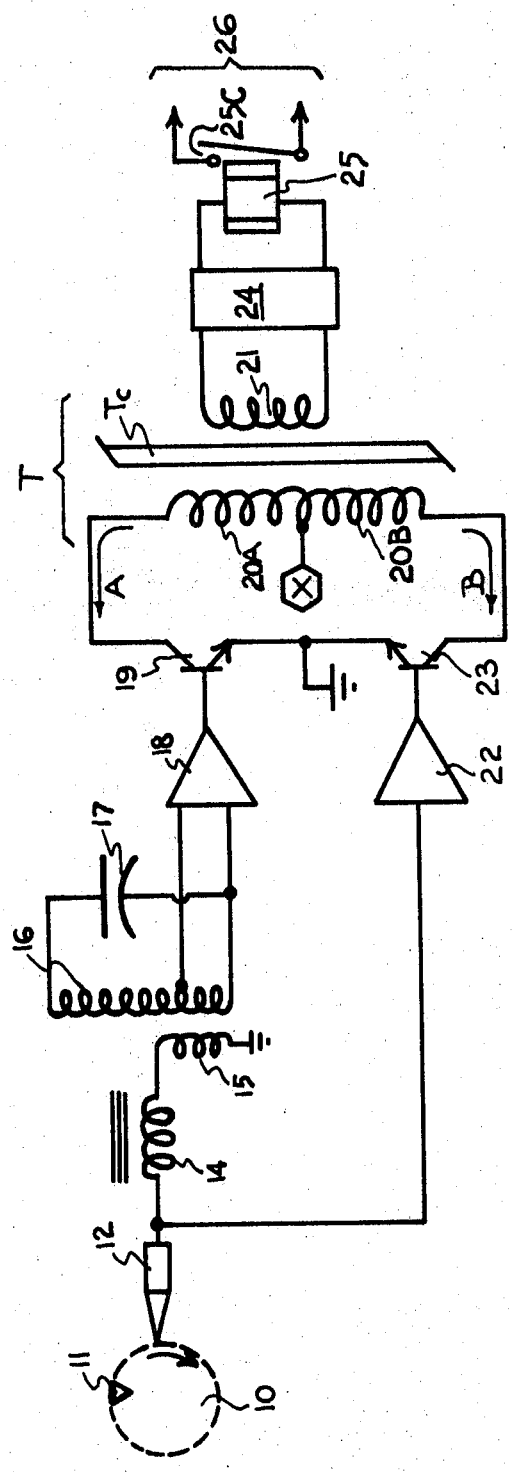
INVENTOR.
RICHARD K. DAVIS
BY John B. Sponsler

1

OVER-FREQUENCY ALARM

BACKGROUND OF THE INVENTION

The rate of rotation of shafts in prime movers is frequently critical, resulting in serious damage to equipment when exceeded. For example, so-called gas turbine prime movers must be suitably protected from "running away" in applications such as the propulsion of propeller shafts in large ships. Overspeed protection in these installations and the like must be simple, fail-safe and foolproof to avoid disastrous damages to ship and cargo and loss of life.

SUMMARY OF THE INVENTION

The present invention involves detecting the abrupt 180° phase reversal of a resonant circuit when the driving excitation of the circuit changes from a frequency below resonance to a frequency above resonance, the driving excitation being derived from a frequency producing source to be controlled when its frequency exceeds a predetermined value corresponding to the resonant frequency of a reference circuit.

BRIEF DESCRIPTION OF THE DRAWING

The drawing is a diagrammatic line representation of a rotation sensor and a coacting electrical circuit.

PREFERRED EMBODIMENT OF THE INVENTION

In the drawing a rotating shaft 10 is provided with a magnetized spot 11 coacting with a magnetic pickup 12, the output of which is coupled through an iron core inductance 14 to an inductance 15 that is inductively coupled to an inductance 16 having a capacitor 17 connected in parallel therewith. The inductance 16 and the capacitor 17 form a resonant circuit of a predetermined reference frequency, the output of the resonant circuit being fed to an amplifier 18, the output of which is connected to a base gated transistor 19 supplying an output to a winding 20A of the primary of a transformer T.

The output of the pickup 12 is also fed directly to an amplifier 22, the output of which is connected to a base gated transistor 23 supplying an output to a winding 20B of the transformer T. Potential for the transistors 19 and 23 is supplied via terminal X to ground. The output of transformer T, a secondary winding 21, is fed through a full wave bridge rectifier 24 to a relay coil 25 for operating the normally open contacts 25C to control a further alarm, or control, circuit 26 (not shown), which when energized by the closing of contacts 25C provides an indication of the rate of rotation of shaft 10.

It is to be noted that the transformer T is provided with a core Tc that is made of so-called "square loop" iron so that the core becomes saturated very quickly.

In operation the circuit arrangement described above provides an output from the pickup 12 of a frequency that is a function of the rotation of the shaft 10, for example. However, it is to be noted that the circuit may be used otherwise, substituting an alternating current of varying frequency from some other source for the output of the pickup 12.

Let it be assumed that the speed of rotation of shaft 10 is increasing so that the frequency of the output of pickup 12 is also increasing. When this frequency is below the frequency of the resonant circuit (inductance 16 and capacitor 17) the impedance of the circuit is largely inductive so that the current lags the voltage substantially by 90°. The inductance 14 further displaces this phase relationship so that the signal fed to the amplifier 18 is approximately 180° displaced from the signal fed to the amplifier 22. In other words the voltage impressed across the winding 20A of transformer T and its corresponding current A is 180° out of phase with the voltage impressed across the winding 20B and its corresponding current B under conditions where the frequency of the output of pickup 12 is below the resonant frequency. Consequently, currents A and B will alternately flow in the windings 20A and 20B providing an output current in the winding 21 to energize the relay coil 25 to close its contacts 25C, indicating to the circuit 26 that the speed of the shaft 10 is below a speed corresponding to the resonant frequency.

However, when the speed of shaft 10 increases so that its effect on pickup 12 produces a frequency above the resonant frequency of the resonant circuit (inductance 16 and capacitor 17) the currents A and B become in phase thereby cancelling their input to the transformer T via their respective windings 20A and 20B so that the net ampere turns effect in the primary of the transformer is zero; consequently, no current is induced in the winding 21 and the relay coil 25 becomes deenergized opening the contacts 25C, indicating to the circuit 26 that the shaft speed is excessive; i.e., above a safe speed predetermined by the frequency of the reference resonant circuit. By changing the resonant frequency of the circuit represented by inductance 16 and capacitor 17, i.e., by substituting different values of capacitors, the circuit can be made responsive to operate at many different critical speeds of rotation of a shaft 10, for example.

In summary, therefore, the invention operates by sensing the abrupt 180° phase reversal in a resonant circuit when the driving frequency of that circuit increases from below resonant frequency to above resonant frequency. The input signal frequency is compared with a tuned circuit frequency, thus producing two signals 180° out of phase below resonant frequency and in phase above resonant frequency, these signals being applied to a transformer so that below the resonant frequency they generate an output sufficient to energize an alarm device connected to the secondary of the transformer and above resonant frequency they do not.

An additional feature of the invention is the "fail safe" operation of the circuit. For example, it has been noted that the transformer T is of a nature to become quickly saturated; consequently, if either current A or current B prevails for any appreciable time without the other, no output will occur at the secondary winding 21. Therefore, since the signals to the transformer windings via the channels of amplifiers 18 and 22 are pulsating direct current, a short circuit or an open circuit in either channel will cause one or the other of these currents to prevail. Similarly, if there is a loss of electrical power source where neither current A nor current B exists, the transformer will have no output in its secondary winding. If the electrical power source increases above operating values to cause a component in either channel to fail, the other channel will provide a primary winding current in the transformer saturating the core, as previously explained.

While the iron core inductance 14 is only one of several ways to produce a 90° phase shift, it also has a unique advantage in a circuit of this type since as the voltage of the pickup 12 increases with frequency the reactance of inductance 14 increases also, tending to provide a constant amplitude of the driving signal from the pickup. The increased impedance of the inductance 14 also tends to improve the Q of the circuit.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

I claim:

1. A circuit for comparing an input signal of varying frequency with a reference frequency including a pair of signal channels for accepting said signal simultaneously, a direct current excited square loop core transformer having a pair of differentially connected primary windings, one winding for each said channel and arranged to receive the outputs of said channels; a secondary winding on said transformer; and phase shifting means including means resonating at said reference frequency in one of said channels for displacing its signal 180° from the signal of the other channel whereby an input signal of reference frequency produces an output from said secondary, said secondary winding connected with an indicating device of said reference frequency.